(12) United States Patent
Jarosz et al.

(10) Patent No.: US 8,964,295 B2
(45) Date of Patent: Feb. 24, 2015

(54) REFRACTIVE STEGANOGRAPHY LENS AND METHOD FOR DETERMINING MILLING PLAN FOR SAME

(75) Inventors: Wojciech Jarosz, Zurich (CH); Marios Papas, Zurich (CH); Derek Nowrouzezahrai, Zurich (CH); Thomas Houit, Zurich (CH)

(73) Assignee: Disney Enterprise, Inc., Burbank, CA (US)

( * ) Notice: Subject to any disclaimer, the term of this patent is extended or adjusted under 35 U.S.C. 154(b) by 406 days.

(21) Appl. No.: 13/470,184

(22) Filed: May 11, 2012

(65) Prior Publication Data

US 2013/0301139 A1 Nov. 14, 2013

(51) Int. Cl.
*G02B 27/10* (2006.01)
*G03B 21/60* (2014.01)
(52) U.S. Cl.
USPC ............................ 359/619; 359/454; 359/651

(58) Field of Classification Search
USPC ......... 359/619, 618, 626, 621, 443, 454–455, 359/630–634, 13–14; 264/1.1, 1.32, 2.7; 457/162, 164, 165, 226–227, 553–555
See application file for complete search history.

(56) References Cited

U.S. PATENT DOCUMENTS

2005/0089163 A1* 4/2005 Luthi ............................ 380/54
2006/0056033 A1* 3/2006 Rosenthal .................... 359/619

* cited by examiner

*Primary Examiner* — Dawayne A Pinkney
(74) *Attorney, Agent, or Firm* — Patterson & Sheridan LLP

(57) ABSTRACT

Techniques are described for designing and manufacturing a refractive surface that produces a desired image when placed over a target image. The refractive lens surface may include a set of lens patches, each of which indexes a region on the source image to refract light from the indexed region to recreate a patch of the target image. And together, the lenses reproduce the target image. In one embodiment, the refractive geometry of the lens surface (i.e., the shape of each lens) is determined by formulating and efficiently determining a solution to an inverse light transport problem. The solution may account for additional constraints imposed by the physical manufacturing procedure. Doing so results in a design for a refractive surface amenable to milling (or other manufacturing process).

31 Claims, 6 Drawing Sheets

US 8,964,295 B2

REFRACTIVE STEGANOGRAPHY LENS AND METHOD FOR DETERMINING MILLING PLAN FOR SAME

BACKGROUND

1. Field

The present disclosure generally presents a translucent surface (such as a milled acrylic plate) that reproduces a given target image by refracting light passing through it, as well as to techniques for designing such a surface. More specifically, the present disclosure teaches techniques for determining a lens surface pattern that refracts light in order to generate a desired image, when the lens is placed over a specific source image.

2. Description of the Related Art

Steganography refers to techniques for hiding information "in plain sight." More formally, steganography generally refers to techniques for encoding information in covert channels in order to conceal the information and prevent detection of the encoded information. For example, a variety of techniques are available for embedding (and subsequently recovering) an encoded message in a digital image, without substantially altering the appearance of that image. Over time, steganographic techniques have ranged dramatically in sophistication and application domain, ranging from using invisible inks such as lemon juice to keep messages hidden until the right catalyst is applied, embedding images as exotic material properties using computational techniques, protecting copyrighted material using watermarks, to sophisticated visual document security for the printing of banknotes.

Some techniques are available for manufacturing three dimensional (3D) objects which reveal desired images when exposed to specific lighting conditions. For example, 3D objects may be constructed which cast shadows that form distinct images. Similarly, techniques have been developed for creating a refractive surface to deform incident light into a desired caustic pattern. Techniques such as these can be used to manipulate light and show to reproduce or create an image.

SUMMARY

Embodiments presented herein include a translucent refractive surface having a two-dimensional array of lens patches. Each lens patch may generally be configured to redirect light from a region of a source image. Further, light redirected from the regions of the source image reproduce a first target image viewed through the refractive surface. In a particular embodiment, the first target image is reproduced when the refractive surface is placed over the source image at a first specified distance and first orientation. Further, the refractive surface may reproduce a second target image when placed over the source image at a second orientation.

Still another embodiment includes a method for determining a topology of a refractive surface. This method may generally include segmenting a target image into a plurality of image patches. Each image patch corresponding to a lens patch in a two-dimensional array of lens patches on a refractive surface. This method also includes, for each image patch: (i) determining a plurality of regions in a source image which match a visual appearance of the image patch, (ii) determining, for the corresponding lens patch, a mapping for each of the plurality of determined regions that refracts light through the refractive surface towards a viewer's eye, (iii) assigning a match score to each of the plurality of mappings, and (iv) assigning one of the plurality of mappings to the image patch.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1B:
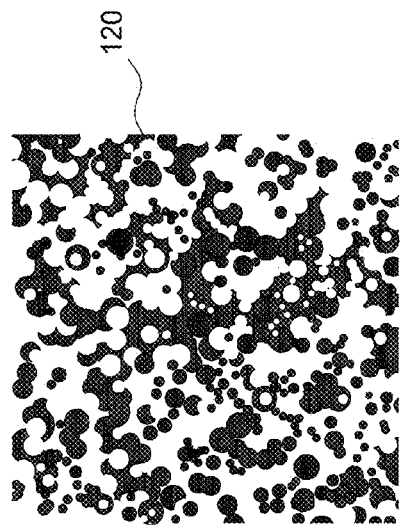
FIGS. 1B-1C illustrate an example of a source image (FIG. 1B) and a steganographic or target image (FIG. 1C) decoded from the source image using the refractive lens of FIG. 1, according to one embodiment.

Embodiments presented herein provide techniques for designing and manufacturing a lens surface that produces a desired image when placed over a target image by refracting light through the lens. More specifically, embodiments presented herein provide techniques for designing and manufacturing passive display devices based on optical hidden image decoding. For example, a lens may be used to reproduce a target image when placed over a printed or displayed source image. Unlike steganogrpahic techniques, the source image is not modified to encode or embed the target image or message in the source image as is done for a variety of digital image steganogrpahic and digital watermarking processes, as well as for lenticular lenses or 3D postcards, and other steganogrpahic approaches. Instead, a refractive lens surface is designed to encode the desired image relative to the source image.

The refractive lens surface may include a set of micro-lens patches, each of which indexes a region on the source image to refract light from the indexed region to recreate a patch of the target image. And together, the topology of the array of lenses on the refractive surface reproduce the target image. In one embodiment, the refractive geometry of the lens surface (i.e., the shape of each micro-lens) is determined by formulating and efficiently determining a solution to an inverse light transport problem, as described in greater detail below. The solution may account for additional constraints imposed by the physical manufacturing procedure. That is, the process of solving for a lens surface may be constrained not only by the desired target image but also by a requirement that the lens surface be physically realizable using available milling techniques. By explicitly compensating for the physical manufacturing limitations in the process of designing a micro-lens array, the approaches described herein generate smooth surfaces that can be manufactured.

The resulting lens surfaces can be used to transform one image into a completely different image, provided that the source image includes each color of the target image. Further, one source image may be used create a lens encoding of two (or more) target images, each revealed when the lens is placed over the image at a prescribed rotational orientation. This latter embodiment involves solving for micro-lens patches that index one region of a source image when placed over a target using a first orientation and index a different region when oriented over the source image using a second (or third, etc.) orientation, e.g., by rotating the lens 90° over the source image.

In one embodiment, a source image, a desired target image is received as input and used to derive a topology for a smooth array of lenses that warp outgoing light from the source image towards a viewer, reproducing the target image. An inverse light transport optimization is used to solve for the refractive micro-lens surface, given target (hidden) images and underlying source images as input.

In the following, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

Further, embodiments are generally described herein relative to a milled surface configured to refract light to recreate an input image. However, one of ordinary skill in the art will recognize that the reference embodiments described be adapted to create a refractive array of micropatches physically realized using other manufacturing techniques.

Figure 1C:
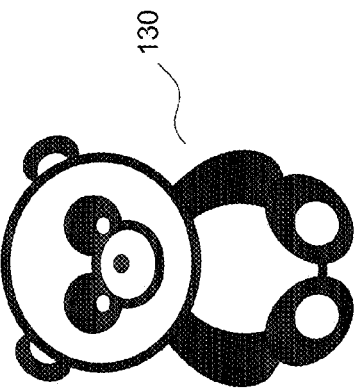
Figure 1A:
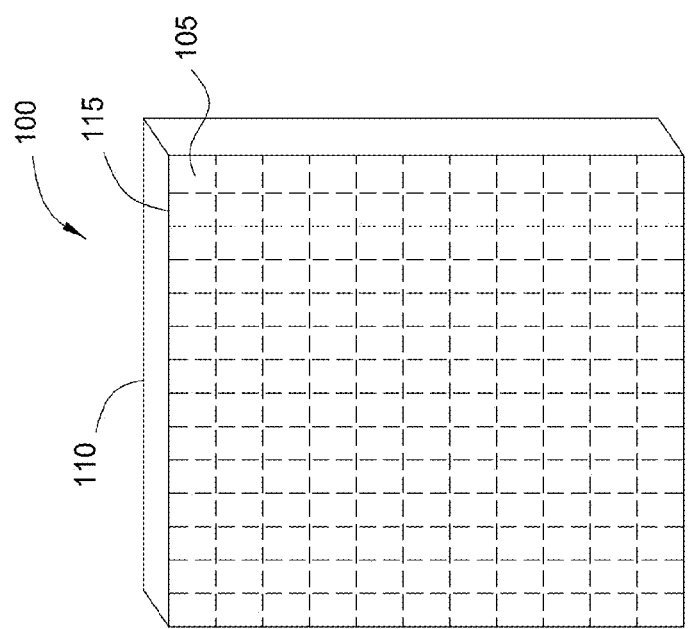
FIG. 1A is a block diagram illustrating a refractive surface configured to reveal a target image by refracting light incident to a source image, according to one embodiment.

FIG. 1A is a block diagram illustrating a refractive surface configured to reveal a target image by refracting light incident to a source image, according to one embodiment. In this example, refractive surface 100 represents a transparent acrylic block with a generally flat rear face 110 and a milled front face 115. The milled front face 115 includes an array of micropatches 105.

Each micropatch 105 provides a lens configured to redirect light refracted from a source image, resulting in a set of patches being projected from the milled front face 115. As shown, the lens surface 100 is divided into an N×N grid of square micropatches 105. The target image is tiled into a corresponding N×N grid of square tiles. Each micropatch 105 is responsible for refracting light from the source image, so that when viewed from a prescribed position, it looks like the target tile. For example, assume the refractive surface 100 includes an array of 32×32 micropatches 105, in such a case, refractive surface 100 would include 1024 micropatches. However, the refractive surface 100 may have more (or fewer) micropatches 105 and the number of micropatches in one dimension need not be equal to the number of micropatches in the other dimension. Further, in the reference example of FIG. 1A, micropatches 105 are each relatively the same size, but other arrangements may be used to suit the needs of a particular case.

Each micropatch lens 105 on the lens surface 100 may be aimed at an arbitrary region of the source image, resulting in a large search space for each micropatch lens 105. In one embodiment, to make this complex optimization space tractable, it is discretized and split into two steps. First, for each micro-patch 105 and corresponding target tile, a large set of P potentially matching image regions in the source image are identified. In one embodiment, potentially matching regions may be found using a sliding window technique across regions of the source image. For each micro-patch/target tile, potential matches are sorted according to their pixel-wise similarity to the target tile.

The total space of all potential matches for each micro-patch constitutes the search space, generally resulting in a search space size $N^2 \times P$. Each potential matching choice induces a certain orientation for that micro-patch. That is, a match between pixels in the source image and target image results in a specific orientation for a micro-lens that will index the matching region when the lens is oriented over the source image at a specific orientation. During a second step, an optimization process is used to choose a match for each micro-patch that minimizes an error term. As described in greater detail below, this error term incorporates both the geometric smoothness of the resulting lens across all the micropatches, as well as the resulting fidelity of reconstructing the target image.

Figure 2:
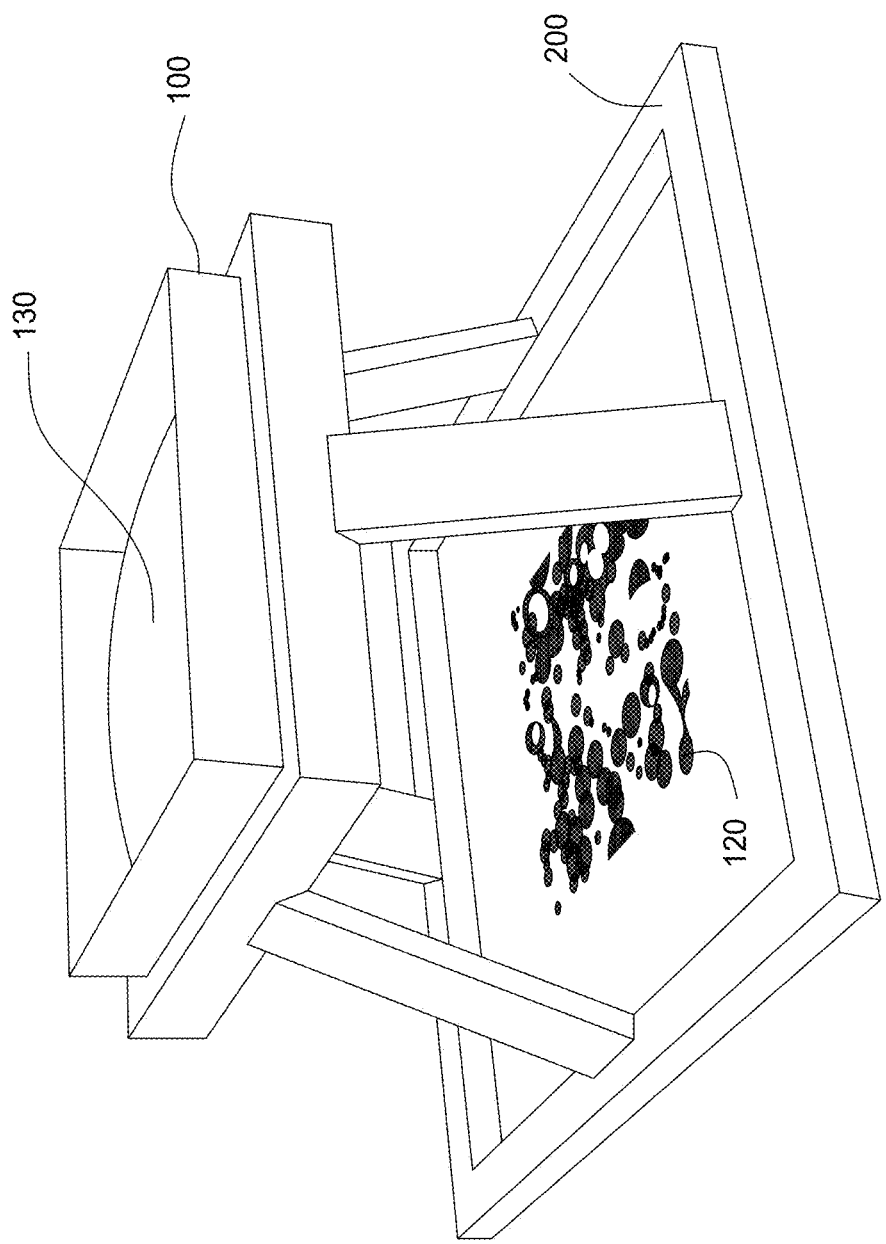
FIG. 2 further illustrates a refractive surface used to reveal a target image by refracting light incident to a source image, according to one embodiment.

FIGS. 1B-1C provide an example of a source image (FIG. 1B) and a steganographic or target image (FIG. 1C) decoded from the source image using the refractive lens of FIG. 1, according to one embodiment. As shown, the source image 105 includes a generally random collection of overlapping white and black circles. The target image 130 shows what image is encoded in the refractive lens 100 when oriented over the source image 105. In this particular example, the refractive lens 100 encodes a cartoon bear. FIG. 2 further illustrates refractive surface 100 used to reveal the target image 130 by refracting light incident to the source image 200, according to one embodiment. As shown, the refractive lens 100 is placed on stand 200 and aligned over the source image 120. The refractive lens 100 redirects light passing through the lens 100 to recreate the target image 130.

Figure 3:
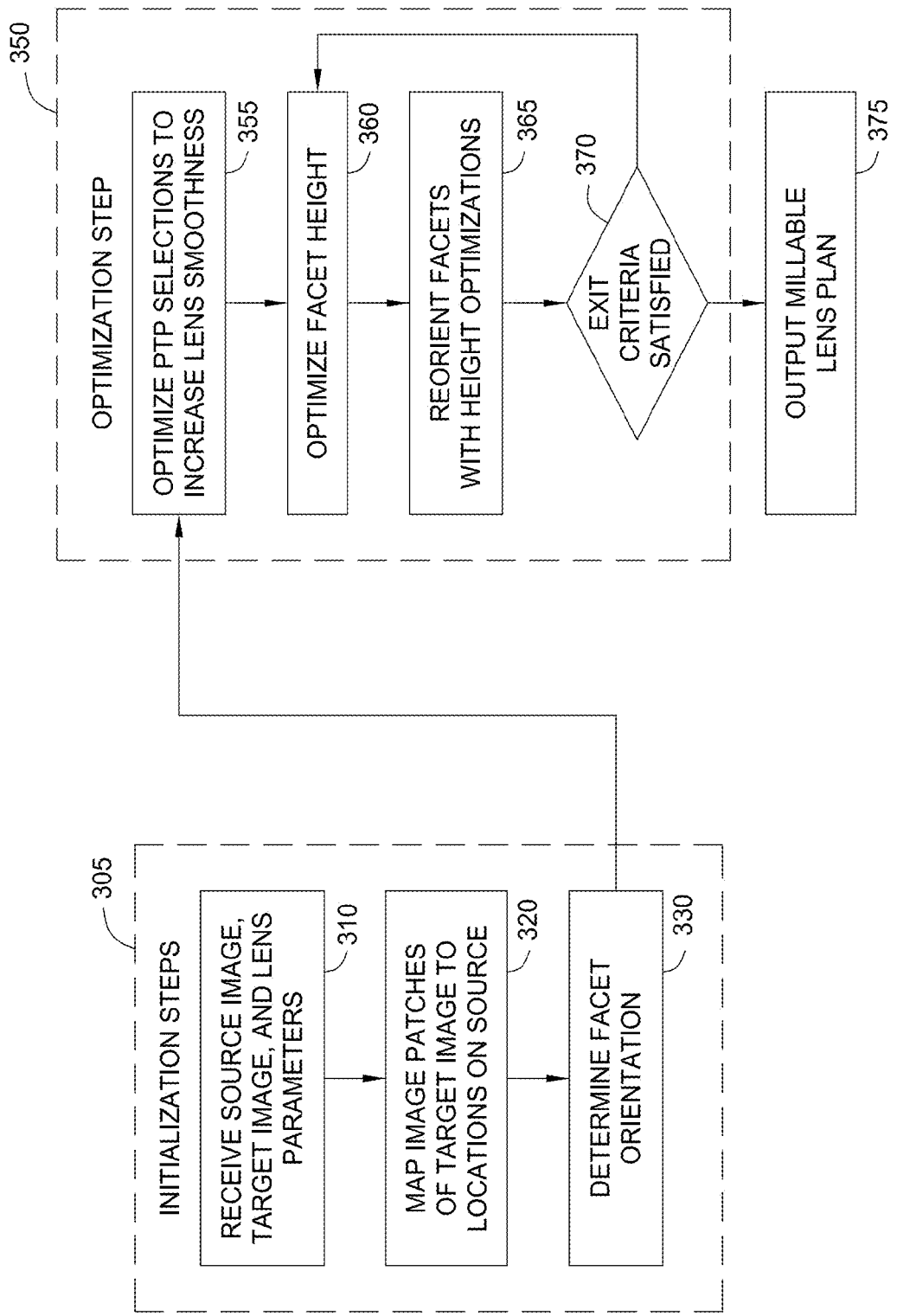
FIG. 3 illustrates a process for determining a lens shape configured to generate a desired target image by refracting light incident to a source image, according to one embodiment.

FIG. 3 illustrates a method 300 for determining a lens shape configured to generate a desired target image by refracting light incident to a source image, according to one embodiment. In this reference example, one (or more) computing applications are configured to determine a milling plan to create a refractive lens like the one described above. As shown, the method 300 includes a set of initialization steps 305 and a set of optimization steps 350. The initialization steps 305 begin at step 305, where a computing application receives a source image target image and a set of lens parameters. For example, the application may receive image file data in a variety of available image formats (e.g., .jpg, .png, etc.), along with expected focal distances from the lens to the source image, from the viewer to the lens, as well as the lens resolution (i.e., the number and arrangements of microfacets).

In one embodiment, the input data may include multiple source and/or target images. For example, the computing application may be configured to create a lens that encodes multiple images—decoded by changing the viewing orientation or position of the lens. Similarly, the computing application may encode multiple images decoded from a single target based on different viewing angles or focal lengths. For example, the computing application could be configured to create a milling pan for a lens that can produce more than one target image depending on the location of the viewer (e.g., the lens reveals a target image of a bird when viewed from the left and reveals a whale when viewed from the right).

Further, the computing application may be configured to create a lens that encodes multiple source-target pairs into a single lens. For example, a source image S1 could be paired with target image T1 and a source image S2 could be paired with target image T2. In such a case, the computing application would create a milling plan for a lens that encodes T1 and T2, revealed when the lens was placed over S1 and S2, respectively. This same approach could be extended to create three (or more) source/target image pairs to encode in a lens.

At step 320, the application segments the target image into a collection of patches. Again, each patch corresponds to a micro-lens on a milled lens surface that recreates the appearance of the patch image by indexing a region on the source image. That is, the target image is divided into patches, each mapped to a facet on the lens. In one embodiment, the application searches and ranks potential patch transformation pairs (PTPs) from the source image, for each target facet. A PTP is an arbitrary rectangular region in the source image, and each PTP has a mapping function defining the transformation necessary to index it from the current target facet (i.e., to refract light so as to recreate the corresponding patch of the target image).

In one embodiment, the initialization steps 305 are performed to determine candidate facets that encode multiple target images, recovered by rotating the refractive surface through different orientations. In such a case, the facet candidates are each selected so as to index regions of a source image to patches from multiple target images.

Figure 4:
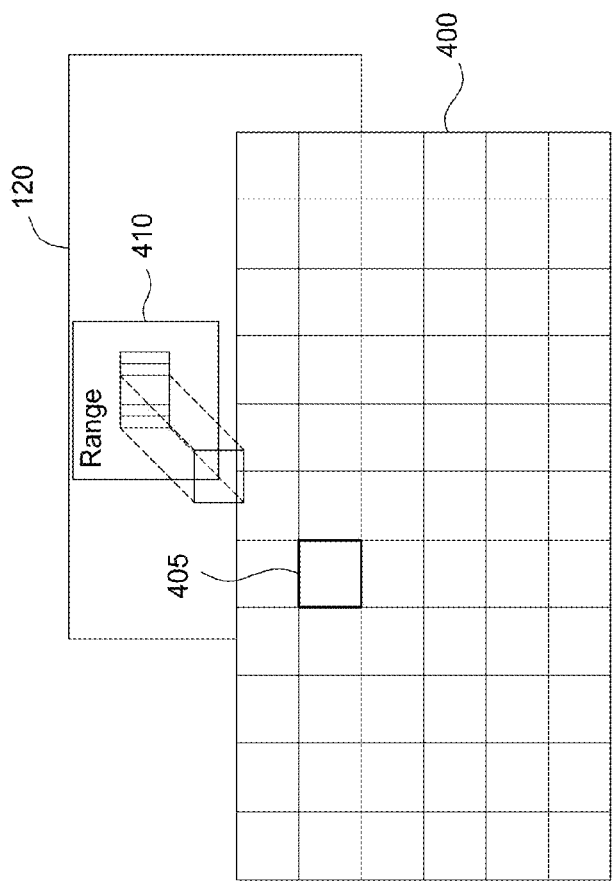
FIG. 4 illustrates an example of evaluating candidate regions of a source image for a micro-lens used to recreate a patch of a target image, according to one embodiment.

After dividing the target image into patches, each of which corresponds to a facet on the lens, the application finds regions in the source image suitable for matching the require output shape/color. FIG. 4 illustrates an example where a segmented target image 400 includes a patch 405. The source image 120 searches with in a defined range 410 of the target image for possible matches to the desired shape and appearance of the patch 405 of target image 400. The area of the range 410 is limited based on the location of the facet in the target image. For example, each facet can only rotate a maximum of 180° about the x or y axes, and so a facet on the far left of the lens cannot index the far right of the source image well. In other words, the facets are physically constrained to only index a limited range of the source.

For each target facet, the application may search a neighborhood of m×m pixels in the source image. And for each region, computes a matching score. In one embodiment, match scores include both correlation term and a smoothing terms, $M = M_d + \lambda M_s$ $$M_d = \sum_{i \in S} \sum_{j \in S} [t(i,j) - s(i + R_x, j + R_y)]^2 \quad \text{(Eq. 1)}$$

and $$M_s = \left[ \frac{1}{(m^2 - R_x^2 - R_y^2 + \varepsilon)} - \frac{1}{m^2 + e} \right] \quad \text{(Eq. 2)}$$

where S is the patch size in pixels, $\{R_x, R_y\} \in \lfloor -m/2, m/2 \rfloor$ are search neighborhood offsets, s indexes colors in the source image, t indexes colors in the target image, $\varepsilon = 1e-4$ and $\lambda = 256^2 \, S/2$ weights the effect of the smoothing term.

In one embodiment, the application computes and sorts M (again, the match score for each given candidate match) over all settings of $R_x \times R_y$ for each facet. The application initially associates the best (lowest) match to a given target facet.

Apart from a score, a match is associated to a PTP which includes the match's ($R_x$,$R_y$) setting. That is, the PTP indicates the region of the source image for a given facet to index and a mapping for the lens to transform it into the appearance and color of the corresponding patch in the target image. All matches with scores below a threshold are retained and stored, along with their PTPs, in a mapping function, for each facet. That is, although each facet is initially assigned the PTP with the lowest match score, all PTPs below a threshold are retained and used during the optimization steps to improve the overall smoothness of the resulting refractive lens surface.

At step 330, the application computes facet normals to induce the required mapping function. That is, the application determines a surface normal needed to orient a given facet in order to index a given region of the source image, for each PTP stored for the given facet.

Following the initialization steps, the optimization steps evaluate the PTPs for each facet in order to optimize the smoothness of a lens composed from the facets. First, at step 350 a simulated annealing process is used to improve the manufacturability of the refractive lens. More specifically, the simulated annealing process performs a stochastic search among facets, and then among PTPs in each facet to reduce variations in the normal orientations between neighboring facets.

In one embodiment, facet normals are initialized so that the top scoring PTP region is warped, through refraction, to the facet. For discussion, this mapping is defined as $$g0:(x,y,\Delta x,\Delta y) \to n_{xy} \qquad \text{(Eq. 3)}$$

where (x, y) are indexes to the coordinates of the lens facets, ($\Delta x$, $\Delta y$) are the offsets onto the source image from the facet, and $n_{xy}$ is the facet normal.

Before determining facet height positions (along the z axis), the simulated annealing process similarity between neighboring facet normals by iteratively selecting a random facet and swapping a current PTP facet assignment with a random PTP assignment from its mapping. After performing a swap, a resulting facet energy is computed which considers both patch-image matching $M_d$ score as well as several geometric smoothness terms:

$$E = M_d + \alpha \|\Delta g_0\|^2 + \beta \|E_1\|^2 \gamma \|E_2\|^2 \qquad \text{(Eq. 4)}$$

where $\Delta g_0$ is a discrete geometric boundary gradient term:

$$A = \|g_0(X+1,Y) - g_0(X,Y)\|^2 = \|(a_x, a_y)\|^2$$

$$B = \|g_0(X-1,Y) - g_0(X,Y)\|^2 = \|(b_x, b_y)\|^2$$

$$C = \|g_0(X,Y+1) - g_0(X,Y)\|^2 = \|(c_x, c_y)\|^2$$

$$D = \|g_0(X,Y-1) - g_0(X,Y)\|^2 = \|(d_x, d_y)\|^2$$

$$\Delta g_0 = \sqrt{A+B+C+D}, \qquad \text{(Eq. 5)}$$

and $E_1$ and $E_2$ are component-wise geometric error terms given by:

$$E_1 = \sqrt{a_y + b_y + c_x d_x}$$

$$E_2 = (\sqrt{a_x} - \sqrt{b_y})^2 + (\sqrt{a_x} - \sqrt{d_y})^2$$

$$+ (\sqrt{c_x} - \sqrt{b_y})^2 + (\sqrt{c_x} - \sqrt{d_y})^2, \qquad \text{(Eq. 6)}$$

While the values of $\alpha$, $\beta$, and $\gamma$ may be set as a matter of preference, experience has shown values of $\alpha$=0.33, $\beta$=0.75, and $\gamma$=1.0, to be effective for some cases.

After computing facet energy, an energy validation test is performed: if the facet energy changed within a given threshold, the change is accepted and the facet is updated. That is, if the change in energy resulting from a random swap of PTP assignments exceeds a threshold, the swap is retained and the process is repeated. Otherwise, the swap is undone. After repeating swapping and energy validation steps for several facets, total lens energy is determined as the sum of all facet entropies, and if the total lens energy is reduced compared to the lens' initial energy, the lens' state is updated. In one embodiment, this entire process is repeated until the rate at which the lens energy decreases meets stopping criteria, such as a minimum reduction in total energy or a minimum number of cycles.

Figure 5:
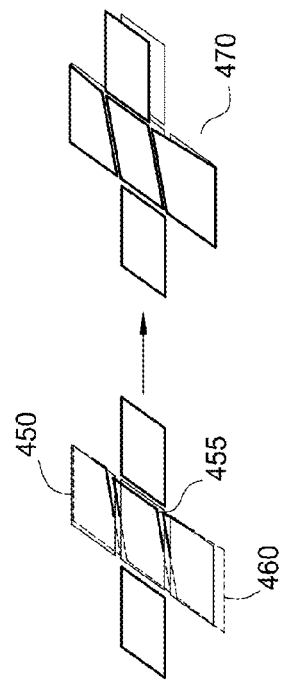
FIG. 5 illustrates a process for increasing a relative smoothness on neighboring micro-lens patches on a refractive surface by optimizing neighboring lens height, according to one embodiment.

Referring again to method 300, at step 360, the application may optimize facet heights. That is, following the simulated annealing step, facet heights may be adjusted to maximize coincidence with neighboring facets along facet boundaries. For example, FIG. 5 shows an exemplary lens surface of four micropatches arranged in a cross, in this example the positions of facets 450, 455, and 460 are adjusted to reduce discontinuities in the lens surface, without distributing the surface normals of these patches.

At step 365, facets with a change in height are reoriented to index the associated region of the source image. As the height optimization performed at step 365 modifies the regions each facet indexes from the source, the facets are re-oriented to index their previously determined PTP. That is the lens surface of a micro-lens is oriented to index the correct region on the target image after its z-depth position is moved closer to (or farther away) from the source image. In one embodiment, the application performs the height optimization process for a given number of cycles. Accordingly, at step 370, the application determines whether exit criteria are satisfied, e.g., a specified number of height optimization cycles or a threshold to changes in the lens surface.

At step 375, the application outputs a plan for a refractive lens surface plan that can be created using any suitable manufacturing process (e.g., milling).

Figure 6:
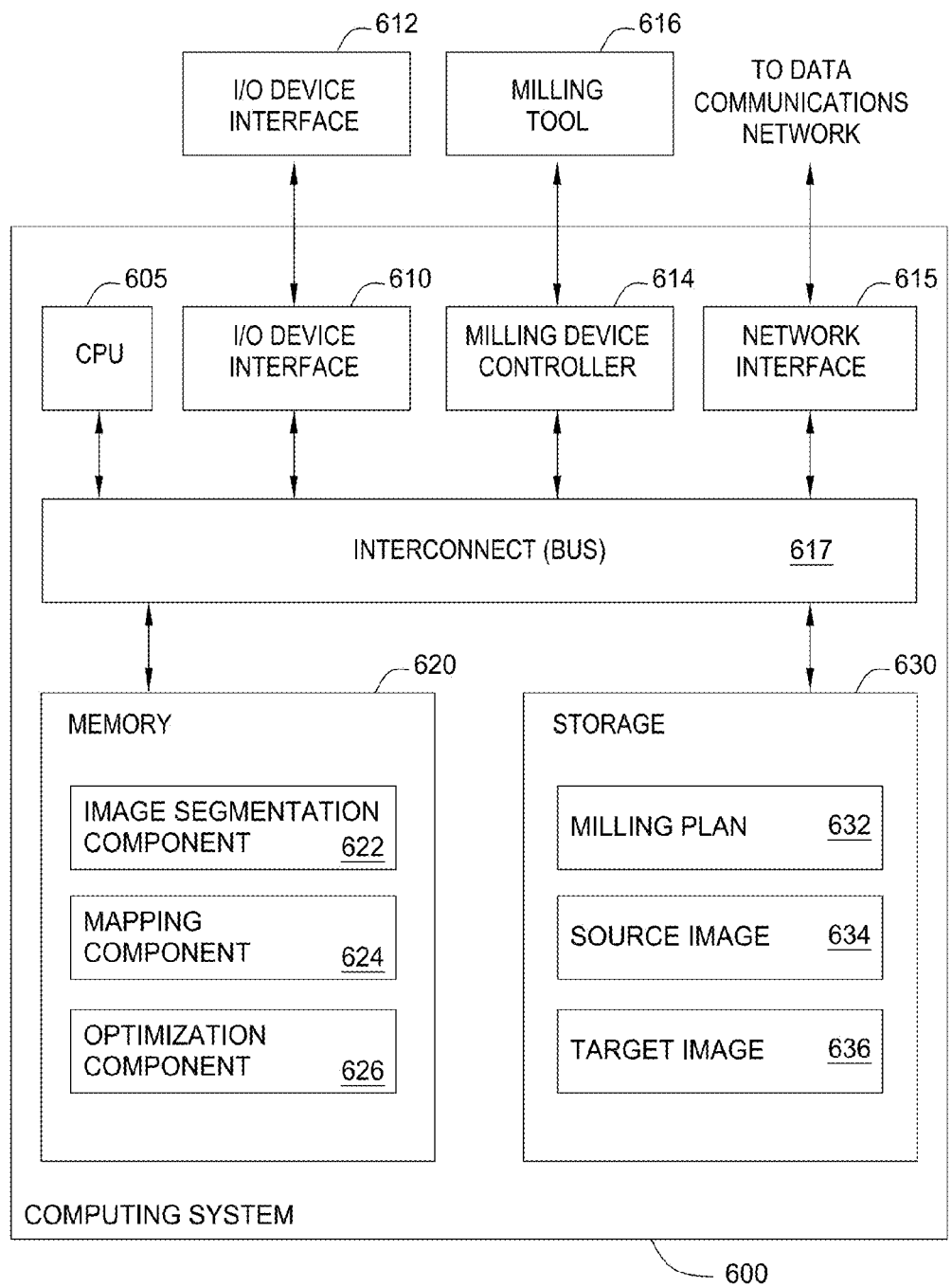
FIG. 6 illustrates an example computing system configured to derive a refractive surface which will refract light incident to a source image to recreate a desired image, according to one embodiment.

FIG. 6 illustrates an example computing system 600 configured to determine a plan for a refractive surface which will refract light incident to a source image to recreate a desired image, according to one embodiment. As shown, the computing system 600 includes, without limitation, a central processing unit (CPU) 605, a network interface 615, a milling device controller 614, a network interface 615, a memory 625, and storage 630, each connected to a bus 617. The computing system 500 may also include an I/O device interface 610 connecting I/O devices 612 (e.g., keyboard, display and mouse devices) to the computing system 600.

The CPU 605 retrieves and executes programming instructions stored in the memory 625 as well as stores and retrieves application data residing in the memory 625. The interconnect 617 facilitates, e.g., transmission of programming instructions and application data between the CPU 605, I/O devices interface 610, storage 630, network interface 615, and memory 625. Note, CPU 605 is included to be representative of a single CPU, multiple CPUs, a single CPU having multiple processing cores, and the like. And the memory 625 is generally included to be representative of a random access memory. The storage 630 may be a disk drive storage device. Although shown as a single unit, the storage 630 may be a combination of fixed and/or removable storage devices, such as fixed disc drives, floppy disc drives, tape drives, removable memory cards, or optical storage, network attached storage (NAS), or a storage area-network (SAN).

Illustratively, the memory 625 includes an image segmentation component 622, a mapping component 624, and a refractive lens optimization component 626. And the storage 630 includes a milling plan, source image, and target image.

The image segmentation component 622 may be configured to receive a target image 634 and segment it into a series of patches. As noted, each patch corresponds to a micro-lens of an array of micro-lenses used to refract light incident to a source image 634 to recreate a target image 636. Once the target image is segmented (i.e., once the appearance of each patch is defined), the mapping component 624 may search in the source image 634 for regions that correspond to the appearance of each patch.

As noted, in one embodiment a matching score for each of multiple candidate regions in the source image 634 is determined and candidate regions that satisfy a threshold are retained and stored. Further, a mapping function is created that specifies a facet orientation to index the region from the position of the micro-lens in the array. Initially each facet is assigned the patch transformation pair (PTP) with the lowest match score. After assigning a PTP to each lens, as well as determining a set of other PTP matches for each lens, the optimization component 626 may optimize the lens facet assignments to determine a lens shape that maximizes the smoothness of the refractive surface. As noted, which PTPs are used for the facets may be optimized using a simulated annealing process. Further, the shape of the refractive surface may be further optimized to reduce surface discontinues by adjusting the heights of neighboring facets.

Following the optimization processes, the optimization component 626 outputs a final milling plan 632 suitable for creating a refractive surface. For example, the milling plan 632 may be output to a milling tool 616 over the milling device controller 614. Note, although the image segmentation component 622, mapping component 624, and refractive lens optimization component 626 are shown as being present on computing system 600, one of ordinary skill in the art will recognize that the functionality described above may be implemented as computing applications in a variety of ways, as well as installed and executed on different computing systems.

Figure 7A:
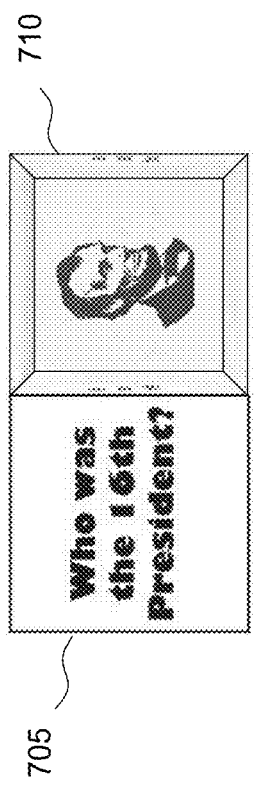
FIG. 7A-7C illustrate additional example embodiments of source and target images created using a refractive lens.
Figure 7B:
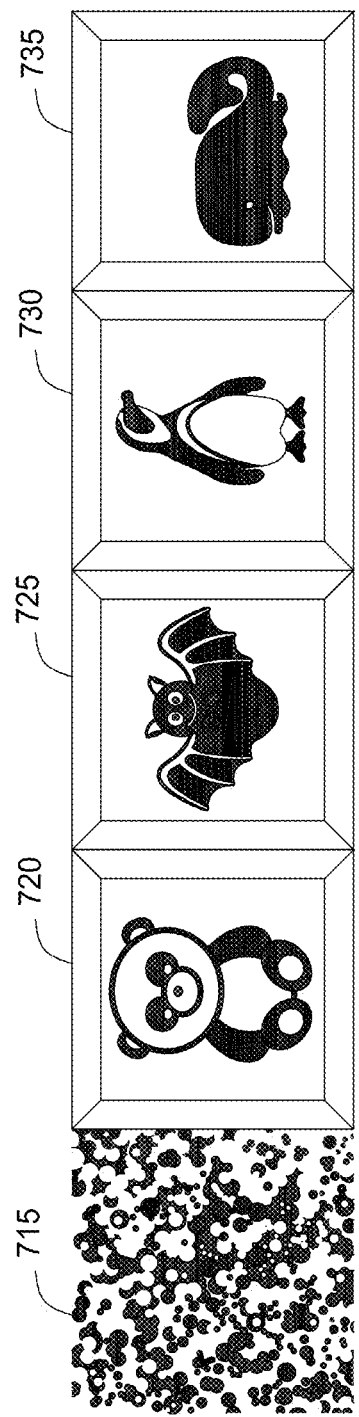
Figure 7C:
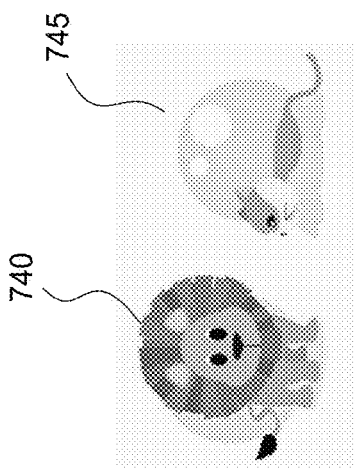

FIG. 7A-7C illustrate additional example embodiments of source and target images created using a refractive lens. In the Example of FIG. 1A, a generally random pattern of white and black overlapping circles is used as a source image for a refractive lens configured to refract this source image to reproduce a cartoon image of a panda bear. However, in addition to using a relatively random source image, other source images may be used. For example, FIG. 7A shows a source image 705 that asks a question with an answer image 710 revealed by placing a refractive lens over the source image 705.

FIG. 7B shows an example where the refractive lens is configured to encode multiple source images. In this example, the cartoon image decoded by the lens depends on how the lens is oriented over source image. Specifically, rotating the refractive surface over the source image 715 results in an image of a cartoon panda 720, an image of a bat 725, an image of a penguin 730, or an image of a whale 735. Similarly, the techniques described above can also encode multiple target images from a single source image revealed depending on the viewing angle or position of the viewer. In such a case, the constraints for identifying regions of the source image are extended to reproduce image patches for multiple targets.

In another embodiment, multiple source images are used to map to different target images. In such an embodiment, the same process for encoding a single image is extended to encode multiple images. For example, instead of determining a region of the source image that refracts light to refract a portion of a single image, the mapping application identifies corresponding regions in multiple source images that can refract light using the same lens surface to create the corresponding image patches. Once identified, the optimization component can optimize the lens surface suing the same approaches discussed above.

Further, in addition to using a random or unstructured image, such as image 715, a refractive surface may encode target images using a variety of source images. For example, source image 740—showing a cartoon lion—could be used as a source image for a target image of a mouse 745 or vice versa. That is, the target image of the mouse 745 could be used to encode the image of the lion 740. Further still, while generally described as encoding cartoon images—such as might be used for consumer products, refractive lens surfaces may be used for a variety of applications. For example, a simple security scheme could be used to create a lens that encoded a password or phrase. In such a case, by keeping the source image secret, the content of the encoded image may be kept secure. Doing so results in a two-factor security scheme where access to a complicated password requires access to something you have (the lens) and something you know (the source image).

Advantageously, as described above, a refractive surface may be designed to produce a target image when placed over a source image. The refractive lens surface may include a set of lens patches, each of which indexes a region on the source image to refract light from the indexed region to recreate a patch of the target image. And together, the lenses reproduce the target image. In one embodiment, the refractive geometry of the lens surface (i.e., the shape of each lens) is determined by formulating and efficiently determining a solution to an inverse light transport problem. The solution may account for additional constraints imposed by the physical manufacturing procedure. That is, the process of solving for a lens surface may be constrained not only by the desired target image but also by a requirement that the lens surface be physically realizable using available milling techniques. By explicitly compensating for the physical manufacturing limitations in the process of designing a lens array, the approaches described herein generate smooth surfaces that can be manufactured.

While the foregoing is directed to embodiments of the present invention, other and further embodiments of the invention may be devised without departing from the basic scope thereof, and the scope thereof is determined by the claims that follow.

What is claimed is:

1. A refractive surface, comprising:
a two-dimensional array of lens patches, wherein each lens patch is configured to redirect light from a region of a source image, wherein the light redirected from the regions of the source image reproduce a first target image viewed through the refractive surface, and wherein a topology of the refractive surface is determined by:
segmenting the first target image into a plurality of image patches, each image patch corresponding to a lens patch in the two-dimensional array of lens patches;
for each image patch:
determining, by operation of one or more computer processors, a plurality of regions in the source image matching a visual appearance of the image patch, determining, for the corresponding lens patch, a mapping for each of the plurality of determined regions that refracts light through the refractive surface towards a viewer's eye, assigning a match score to each of the plurality of mappings, and assigning one of the plurality of mappings to the image patch.

2. The refractive surface of claim 1, wherein the first target image is reproduced when the refractive surface is placed over the source image at a first specified distance and first orientation.

3. The refractive surface of claim 1, wherein the refractive surface reproduces a second target image when placed over the source image at a second orientation.

4. The refractive surface of claim 1, wherein the refractive surface reproduces the first target image when viewed at a first predefined viewing position and a second target image when viewed at a second predefined viewing position.

5. The refractive surface of claim 1, wherein the topology of the refractive surface is further determined by:
optimizing the assigned mappings from the plurality of image patches to the determined regions of the source image using a simulated annealing process.

6. The refractive surface of claim 5, wherein the optimization process is performed to optimize a smooth surface shape for the refractive surface 7. The refractive surface of claim 5, wherein the topology of the refractive surface is further determined by:
optimizing the refractive surface by adjusting the height of one or more of the lens patches on the refractive surface to reduce discontinuities between neighboring lens patches in the two-dimensional array of lens patches.

8. The refractive surface of claim 7, after adjusting the height of a first lens patch, re-determining, for the first lens patch, the mapping that refracts light through the refractive surface.

9. The refractive surface of claim 5, wherein determining a mapping for each of the plurality of determined regions comprises determining a surface normal of a lens required to orient the lens patch such that the lens patch refracts light through the refractive surface.

10. The refractive surface of claim 5, wherein the match score is determined based on both a correlation term and a smoothing term.

11. The refractive surface of claim 1, wherein each lens patch is further configured to redirect light from a region of a second source image and wherein the light redirected from the regions of the second source image reproduce a second image viewed through the refractive surface.

12. A method for determining a topology of a refractive surface, the method comprising:
segmenting a target image into a plurality of image patches, each image patch corresponding to a lens patch in a two-dimensional array of lens patches on a refractive surface;
for each image patch:
determining, by operation of one or more computer processors, a plurality of regions in a source image which match a visual appearance of the image patch,
determining, for the corresponding lens patch, a mapping for each of the plurality of determined regions that refracts light through the refractive surface towards a viewer's eye,
assigning a match score to each of the plurality of mappings, and
assigning one of the plurality of mappings to the image patch.

13. The method of claim 12, wherein assigning one of the plurality of mappings to the image patch comprises.
optimizing the assigned mappings from the plurality of image patches to determined regions of the source image using a simulated annealing process.

14. The method of claim 13, wherein the simulated annealing process is performed to optimize a smooth surface continuity of the refractive surface.

15. The method of claim 13, wherein the topology of the refractive surface is further determined by:
optimizing the refractive surface by adjusting the height of one or more of the lens patches on the refractive surface to reduce discontinuities between neighboring lens patches in the two-dimensional array of lens patches.

16. The method of claim 15, after adjusting the height of a first lens patch, re-determining, for the first lens patch, the mapping that refracts light through the refractive surface.

17. The method of claim 12, wherein determining a mapping for each of the plurality of determined regions comprises determining a surface normal of a lens required to orient the lens patch such that the lens patch refracts light through the refractive surface.

18. The method of claim 12, further comprising, generating a milling plan for creating the refractive surface having the two-dimensional array of lens patches.

19. The method of claim 12, wherein the match score is determined based on both a correlation term and a smoothing term.

20. The method of claim 12, wherein determining a mapping for each of the plurality of determined regions comprises determining a surface normal of a lens required to orient the lens patch such that the lens patch refracts light through the refractive surface.

21. The method of claim 12, wherein each lens patch is further configured to redirect light from a region of a second source image and wherein the light redirected from the regions of the second source image reproduce a second image viewed through the refractive surface.

22. A non-transitory computer readable storage medium storing one or more applications, which, when executed on a processor, perform operations for determining a topology of a refractive surface, the operations comprising:
segmenting a target image into a plurality of image patches, each image patch corresponding to a lens patch in a two-dimensional array of lens patches on a refractive surface;
for each image patch:
determining a plurality of regions in a source image which match a visual appearance of the image patch,
determining, for the corresponding lens patch, a mapping for each of the plurality of determined regions that refracts light through the refractive surface towards a viewer's eye,
assigning a match score to each of the plurality of mappings, and
assigning one of the plurality of mappings to the image patch.

23. The non-transitory computer readable storage medium of claim 22, wherein assigning one of the plurality of mappings to the image patch comprises.
optimizing the assigned mappings from the plurality of image patches to determined regions of the source image using a simulated annealing process.

24. The non-transitory computer readable storage medium of claim 23, wherein the simulated annealing process is performed to optimize a smooth surface continuity of the refractive surface.

25. The non-transitory computer readable storage medium of claim 23, wherein the topology of the refractive surface is further determined by:

optimizing the refractive surface by adjusting the height of one or more of the lens patches on the refractive surface to reduce discontinuities between neighboring lens patches in the two-dimensional array of lens patches.

26. The non-transitory computer readable storage medium of claim 25, after adjusting the height of a first lens patch, re-determining, for the first lens patch, the mapping that refracts light through the refractive surface.

27. The non-transitory computer readable storage medium of claim 22, wherein determining a mapping for each of the plurality of determined regions comprises determining a surface normal of a lens required to orient the lens patch such that the lens patch refracts light through the refractive surface.

28. A system, comprising:

a processor; and a memory storing one or more applications, which, when executed on the processor, perform operations for determining a topology of a refractive surface, the operations comprising:

segmenting a target image into a plurality of image patches, each image patch corresponding to a lens patch in a two-dimensional array of lens patches on a refractive surface, and for each image patch:
determining a plurality of regions in a source image which match a visual appearance of the image patch;
determining, for the corresponding lens patch, a mapping for each of the plurality of determined regions that refracts light through the refractive surface towards a viewer's eye;
assigning a match score to each of the plurality of mappings; and
assigning one of the plurality of mappings to the image patch.

29. The system of claim 28, wherein assigning one of the plurality of mappings to the image patch comprises.

optimizing the assigned mappings from the plurality of image patches to determined regions of the source image using a simulated annealing process to optimize a smooth surface continuity of the refractive surface.

30. The system of claim 29, wherein the topology of the refractive surface is further determined by:

optimizing the refractive surface by adjusting the height of one or more of the lens patches on the refractive surface to reduce discontinuities between neighboring lens patches in the two-dimensional array of lens patches; and re-determining, for each of the one or more lens patches, the mapping that refracts light through the refractive surface.

31. The system of claim 28, wherein determining a mapping for each of the plurality of determined regions comprises determining a surface normal of a lens required to orient the lens patch such that the lens patch refracts light through the refractive surface.

* * * * *